(12) United States Patent
Fischer et al.

(10) Patent No.: US 6,439,733 B1
(45) Date of Patent: Aug. 27, 2002

(54) REMOVABLE HELMET LIGHT SYSTEM

(76) Inventors: Ernst W Fischer, P.O. Box 190151, Anchorage, AK (US) 99519; Stephen Karcz, P.O. Box 190151, Anchorage, AK (US) 99519

( * ) Notice: Subject to any disclaimer, the term of this patent is extended or adjusted under 35 U.S.C. 154(b) by 0 days.

(21) Appl. No.: 09/550,084

(22) Filed: Apr. 13, 2000

(51) Int. Cl.[7] ................................................. F21L 15/14
(52) U.S. Cl. ...................... 362/106; 362/541; 362/473; 362/475; 362/106; 362/546; 362/549
(58) Field of Search ................................ 362/473, 475, 362/106, 546, 549, 541

(56) References Cited

U.S. PATENT DOCUMENTS

| | | | | |
|---|---|---|---|---|
| 4,195,328 A | * | 3/1980 | Harris, Jr. | 362/72 |
| 5,040,099 A | * | 8/1991 | Harris | 362/106 |
| 5,570,946 A | * | 11/1996 | Chien | 362/84 |
| 5,588,736 A | * | 12/1996 | Hea, Sr. | 362/106 |
| 6,244,721 B1 | * | 6/2001 | Rodriguez et al. | 362/106 |

* cited by examiner

Primary Examiner—Sandra O'Shea
Assistant Examiner—Anabel Ton
(74) Attorney, Agent, or Firm—Michael J. Tavella

(57) ABSTRACT

A light system that attaches to a helmet. The light is designed to be removable. The system has a forward head light that enables a rider to illuminate in whatever direction the rider's head is looking. It has a translucent shell. In one embodiment, the shell is colored red. Light from the headlamp is allowed to leak through the rear of the shell, which gives the appearance of a taillight. In a second embodiment, the device has a forward headlamp and a second bulb that illuminates the rear shell. In a modification of this embodiment, the rear lamp has two filaments. One filament remains on all the time and acts as a taillight. The other filament is activated by the brake handle of the vehicle. In this way, it acts as a brake light, further warning other riders that the vehicle is slowing.

11 Claims, 4 Drawing Sheets

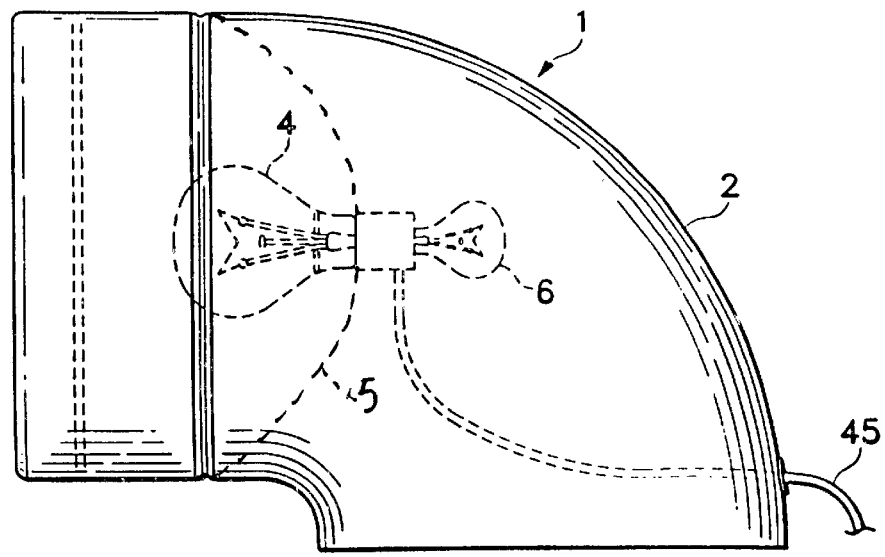
Fig. 3
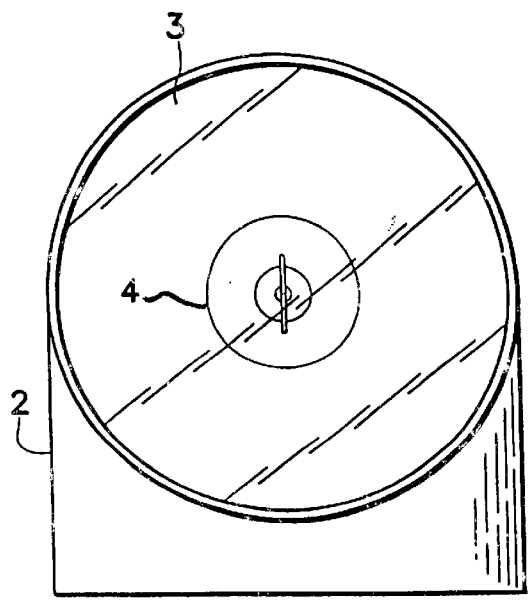 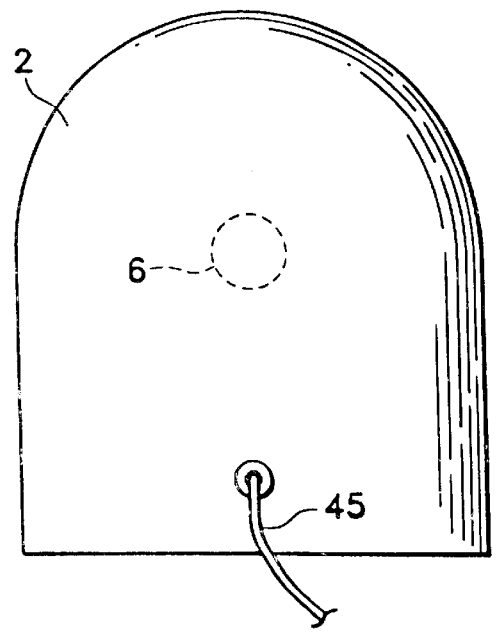
Fig. 4　　　Fig. 5

REMOVABLE HELMET LIGHT SYSTEM

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the invention

This invention relates to lights that are attached to helmets and particularly to lights that are attached to helmets that have both a headlamp and a tail lamp.

2. Description of Related Art

Snow machines, all terrain vehicles, motorcycles and other small off-road vehicles are used extensively for both recreation and work. These devices allow access to back-country locations that are often otherwise inaccessible. Most of these vehicles have headlights that allow use of the vehicles at night. These headlamps are limited however. While they do illuminate the trail immediately in front of the vehicle, they do not illuminate around the vehicle. This means that a person approaching such a vehicle at night may not see the vehicle until they are too close for safe operation. The restriction of the headlight means that a rider looking to one side of the vehicle has no light to illuminate the field of view. This can be dangerous if there are animals, or other dangerous conditions that the rider cannot see.

Riders often wear helmets that are used for protection. Several forms of headlamps have been developed to overcome the problem of illuminating the sides of a trail. The problem with these lights is that they are limited to projecting light forward of the rider. They do nothing to solve the problem of warning approaching riders that a vehicle is on the trail.

BRIEF SUMMARY OF THE INVENTION

The instant invention overcomes this problem. It is a light system that attaches to a helmet. The light is designed to be removable. The system has a forward head light that enables a rider to illuminate in whatever direction the rider's head is looking. Moreover, it has a translucent shell. In one embodiment, the translucent shell is colored red. The shell allows light from the headlamp to leak through the rear of the shell. Because the shell is red, this light gives the appearance of a taillight that warns other riders of the vehicle's presence. In a second embodiment, the device has a forward headlamp and a second bulb that illuminates the rear shell. In a modification of this embodiment, the rear lamp has two filaments. One filament remains on all the time and acts as a taillight. The other filament is activated by the brake handle of the vehicle. In this way, it acts as a brake light, further warning other riders that the vehicle is slowing.

Finally, the lamp system is designed to be removable. In this way, a rider can remove the light system and use the light as a hand-held unit away from the vehicle.

BRIEF DESCRIPTION OF THE DRAWINGS

FIG. 3 is a side view of the invention.

FIG. 4 is a front view of the invention.

FIG. 5 is a back view of the invention.

DETAILED DESCRIPTION OF THE INVENTION

Figure 1:
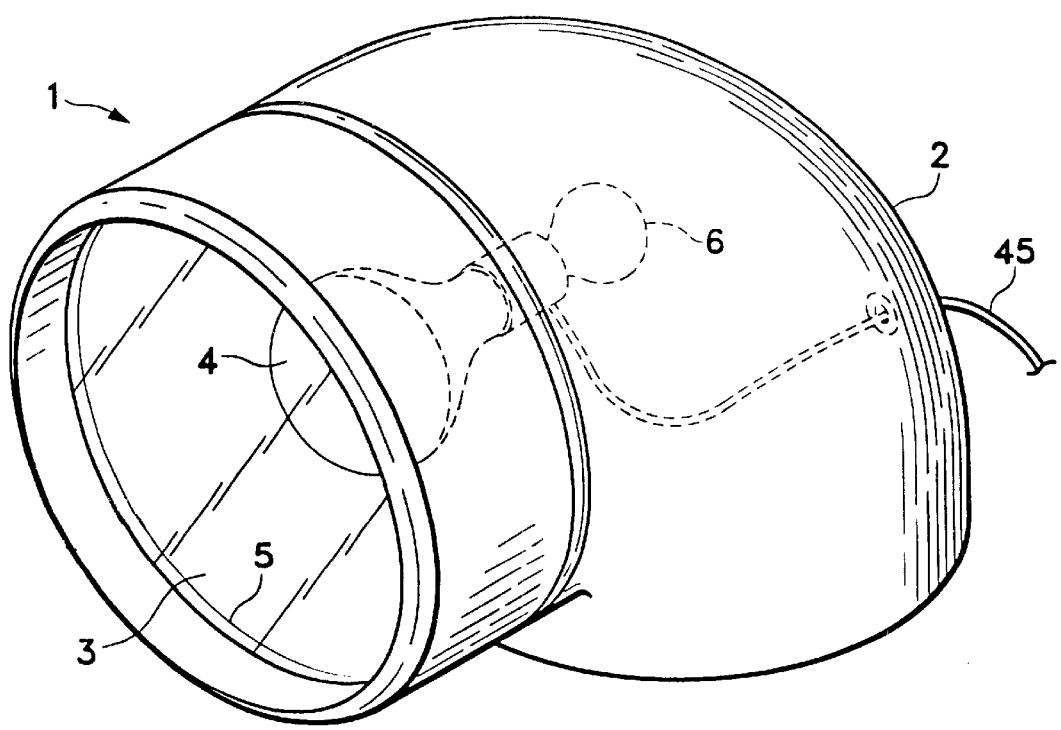
FIG. 1 is a perspective view of the invention.
Figure 2:
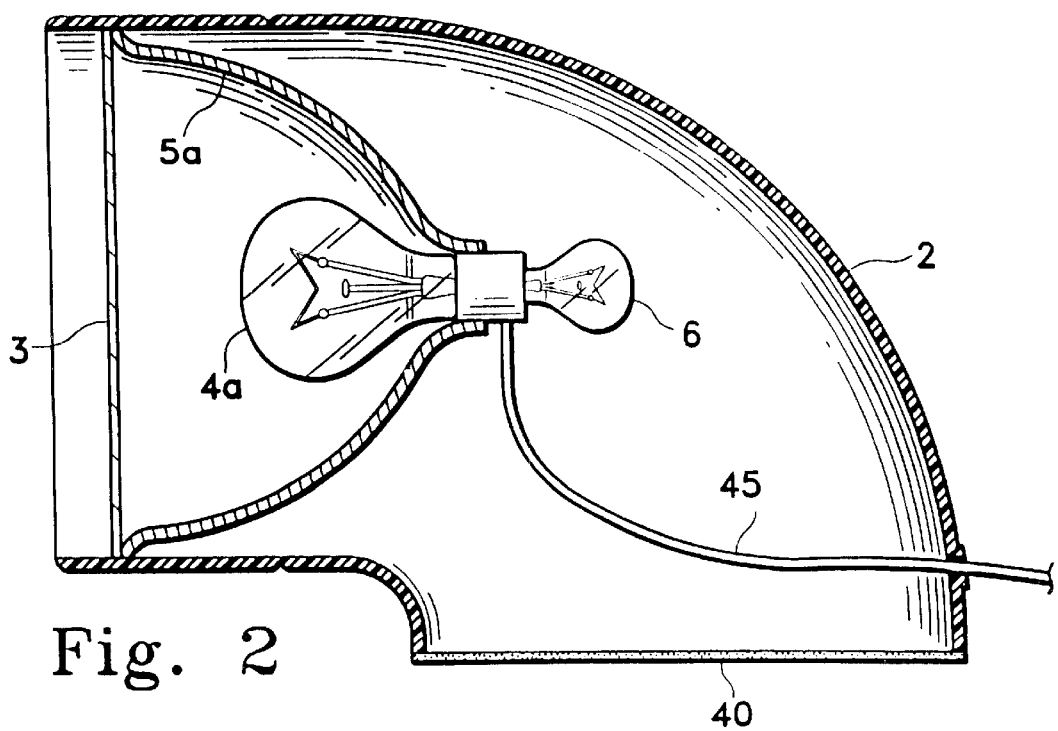
FIG. 2 is a cross-sectional side view of a second embodiment of the invention.

Referring now to FIG. 1, the helmet light 1 is shown. The light 1 has a plastic shell 2. In the preferred embodiment, the plastic shell 2 is translucent. In the preferred embodiment, shell may be colored. The preferred color is red; however other colors, such as yellow or amber may be used. A headlamp 3 is mounted inside the shell 2 as shown in FIG. 2. In the preferred embodiment, the headlamp 3 is a 35-watt halogen type bulb. Such as a MR-16 type with a G 5.3 connector base. This type of bulb has a filament 4 and a reflector 5 in one formed unit. See FIG. 1. It is also possible to make the device using a small bulb 4a and a reflector 5a, see FIG. 2. In either case, the housing 2 is designed to hold the headlamp in place. Note that the electrical connectors and the housing are designed to withstand the heat generated by the head lamp bulb.

In one embodiment of the device, the light produced by the headlamp 3 illuminates the entire shell. White light projects forward to illuminate in front of the user. Because the shell is red plastic, the light emanating from the back of the shell, however, appears red, like a taillight.

In the preferred embodiment, a second bulb 6 is placed in the shell as shown. This bulb can either have one or two filaments. In the case of one filament, the bulb 6 is activated by a momentary contact switch that is tied to the operation of a vehicle's brakes. Thus, when a rider activates the brakes, the second light illuminates the back of the shell. This bulb then acts like a brake light.

In a modification of the preferred embodiment, the rear bulb can have two filaments. The first filament remains on whenever the device is energized. This filament acts as a taillight. The second filament operates when the brakes are applied, as discussed above. This second filament acts as a brake light to warn approaching riders.

FIGS. 3, 4 and 5, show the front back and side views of the shell.

Figure 6:
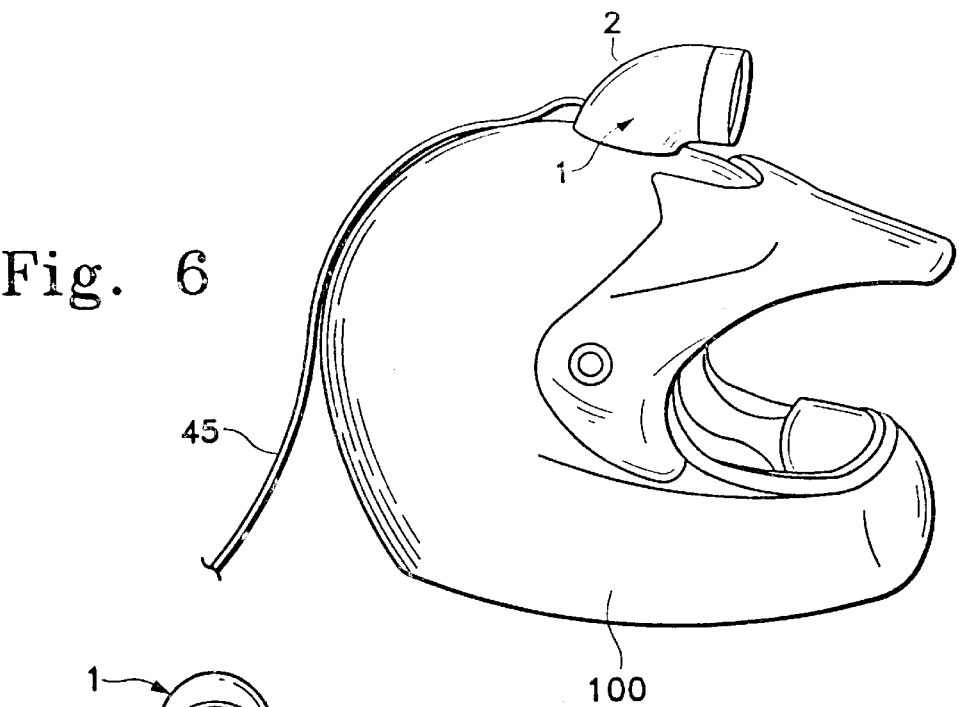
FIG. 6 is a perspective view of the invention mounted on a helmet.
Figure 7:
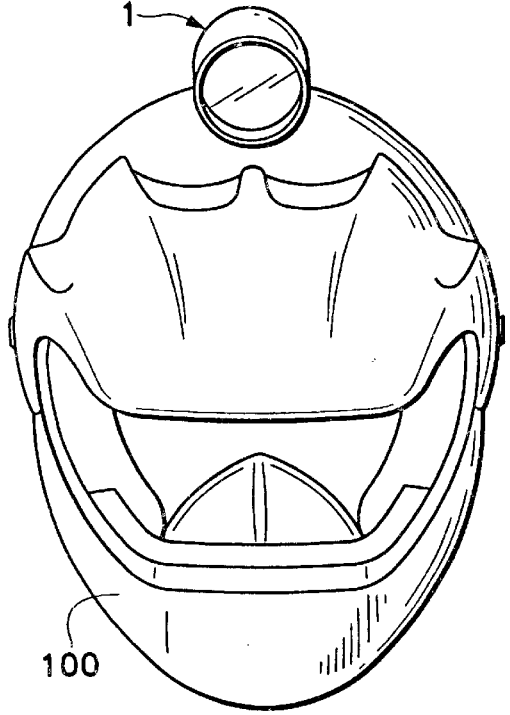
FIG. 7 is a front detail view of the invention mounted on a helmet.
Figure 8:
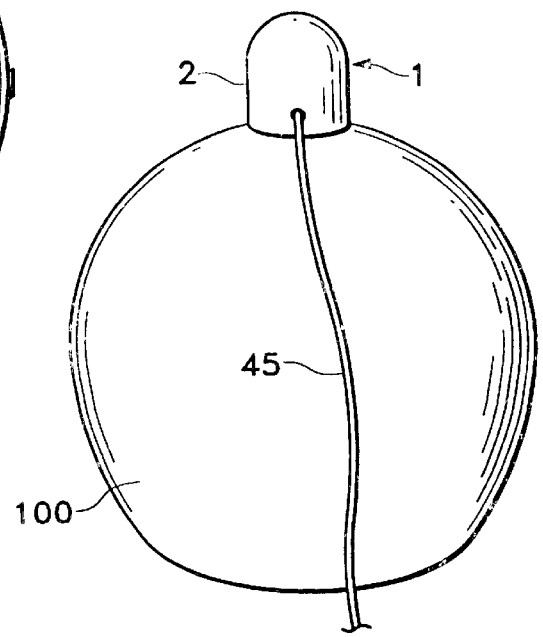
FIG. 8 is a rear detail view of the invention mounted on a helmet.

FIGS. 6, 7 and 8 show the device attached to a typical helmet 100. Note that the light is designed to ride high enough on the helmet to allow riders approaching from the rear to see it. See, e.g., FIG. 8. This ensures that the full effect of the tail light-brake light is seen.

The device is designed to be removably attached to the helmet 100. The can be accomplished in a number of ways. For example, VELCRO, a widely used hook and loop type fastener can be applied to the bottom of the shell and the helmet. Another method uses a bracket that is installed on the helmet and a mating flange that is formed on the light. Obviously, there are numerous other means for removably attaching the light to the helmet. By making the light removable, the user can use the light as a hand held flashlight, or as light for a tent, or any other convenient purpose.

Figure 9:
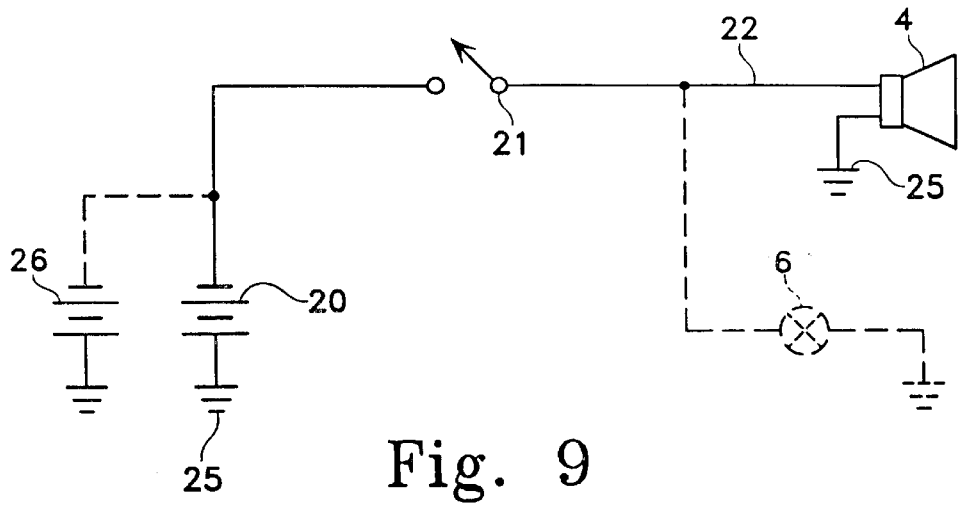
FIG. 9 is a schematic wiring diagram of one embodiment of the invention.

FIG. 9 is a schematic diagram of one embodiment of the invention. A battery 20 is attached to a master switch 21. The master switch attached to the headlamp as shown, with wires 22. The main battery 20 is secured to the rider in a small case (not shown). As discussed above, when a second bulb 6 is used as a taillight, it is connected as shown. The bulb 6 is shown in dashed lines here to indicate that it is optional. Note that the circuit grounds 25 are connected in the usual manner. If desired, a second battery 26 may be connected. This battery may be the main battery on the vehicle, or an auxiliary battery carried by the user.

Figure 10:
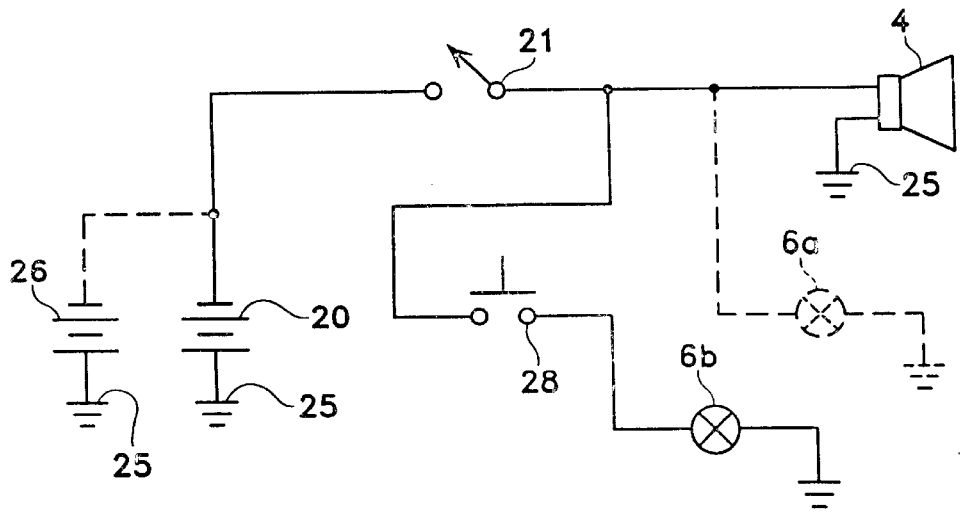
FIG. 10 is a schematic wiring diagram of a second embodiment of the invention.

FIG. 10 shows a second embodiment of the invention. Here, the components discussed above are wired as before. However, a second filament 6b is placed in the circuit. A momentary contact switch 29 is used to control the operation of this filament. The momentary contact switch 29 is connected to the brake lever on the vehicle so that whenever the brakes are applied, the second filament 6b is illuminated. Here, a third filament 6a is also shown. It is shown in dashed lines to indicate that it is optional. This third filament is included in bulb 6 and acts as a continuous-burn taillight, as discussed above. Note that while the figure shows the placement of the momentary contact switch as being after the main power switch, it does not have to be in this position. In the preferred embodiment, the switch is the brake light switch on the vehicle. As such, it does not have to be connected to the headlight circuit. There are many variations for wiring this system. The figures show representative schemes, but the invention is not limited to those specific diagrams. For example, the preferred embodiment uses temporary connectors to make the circuits. In this way, the helmet and light wiring can be disconnected from the vehicle if the user desires to leave the vehicle for some reason. Of course, a permanent wire may also be used to make the connections. These types of connectors are well know in the art and may be modified within the scope of the instant invention.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

What is claimed is:

1. A light for use with helmets comprising:
  a) a translucent shell, said translucent shell having a front, a back and a bottom;
  b) a headlamp, operably installed within the front of said translucent shell, whereby light from said headlamp passes through said shell and illuminates the back of said translucent shell;
  c) a rear lamp, installed within said shell, whereby when said rear lamp is illuminated light produced by said rear lamp illuminates the back of said translucent shell;
  d) a means for intermittently operating said rear lamp; and
  e) a means for removably attaching said translucent shell to a helmet.

2. The light of claim 1, wherein the means for removably attaching said translucent shell to a helmet comprises a hook and loop fastener.

3. The light of claim 1 wherein the translucent shell has a color.

4. The light of claim 1 wherein the color of said translucent shell is selected from the group of red, yellow, and amber.

5. The light-of claim 1 further comprising a power source to operate said headlamp and said rear lamp, in electrical communication with said headlamp and said rear lamp.

6. The light of claim 5 wherein said power source comprises a battery.

7. The light of claim 6 wherein said battery is installed on a vehicle.

8. A light for use with helmets comprising:
  a) a translucent shell, said translucent shell having a front, a back and a bottom;
  b) a headlamp, having a reflector, operably installed within the front of said translucent shell;
  c) a rear lamp, installed within said shell, said rear lamp having a first filament and a second filament, whereby said first filament is operated continuously such that when said rear lamp is illuminated light produced by said rear lamp illuminates the back of said translucent shell, and further such that when said second filament is illuminated said first and said second filaments illuminate the translucent shell, thereby producing a brighter level of illumination;
  d) a means for intermittently operating said second filament of said rear lamp; and
  e) a means for removably attaching said translucent shell to a helmet.

9. The light of claim 8 wherein the means for removably attaching said translucent shell to a helmet comprises a hook and loop fastener.

10. The light of claim 8 wherein the translucent shell has a color.

11. The light of claim 8 wherein the color of said translucent shell is selected from the group of red, yellow, and amber.

* * * * *